US008781079B2

(12) United States Patent
Hao et al.

(10) Patent No.: US 8,781,079 B2
(45) Date of Patent: Jul. 15, 2014

(54) VISUAL VOICEMAIL PROXY SERVER

(75) Inventors: Jack Jianxiu Hao, Lexington, MA (US); Dahai Ren, Waltham, MA (US); Shuai Wu, Waltham, MA (US); Diego Sebastian Rozensztejn, Brookline, MA (US); Guillermo Ortiz, Brookline, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 873 days.

(21) Appl. No.: 12/571,975

(22) Filed: Oct. 1, 2009

(65) Prior Publication Data

US 2011/0081006 A1 Apr. 7, 2011

(51) Int. Cl.
*H04M 11/00* (2006.01)

(52) U.S. Cl.
USPC .................................... 379/88.13; 379/88.18

(58) Field of Classification Search
CPC . H04M 3/53325; H04M 3/493; H04M 3/533; H04M 7203/4536; H04M 2201/60; H04L 12/589
USPC ................................. 379/88.11, 88.12, 88.18
See application file for complete search history.

(56) References Cited

U.S. PATENT DOCUMENTS

| 8,116,744 | B1 * | 2/2012 | Mikan et al. | 455/413 |
| 2009/0154667 | A1 * | 6/2009 | Hao et al. | 379/88.18 |
| 2010/0159889 | A1 * | 6/2010 | Sigmund et al. | 455/413 |

* cited by examiner

*Primary Examiner* — Amal Zenati

(57) ABSTRACT

A server device receives a request for voicemail information from a user device, retrieves the voicemail information, performs data calls to another server device to obtain information to construct a visual user interface that includes data regarding the voicemail information, constructs the visual user interface using the obtained information, and transmits the constructed visual user interface to the user device.

21 Claims, 10 Drawing Sheets

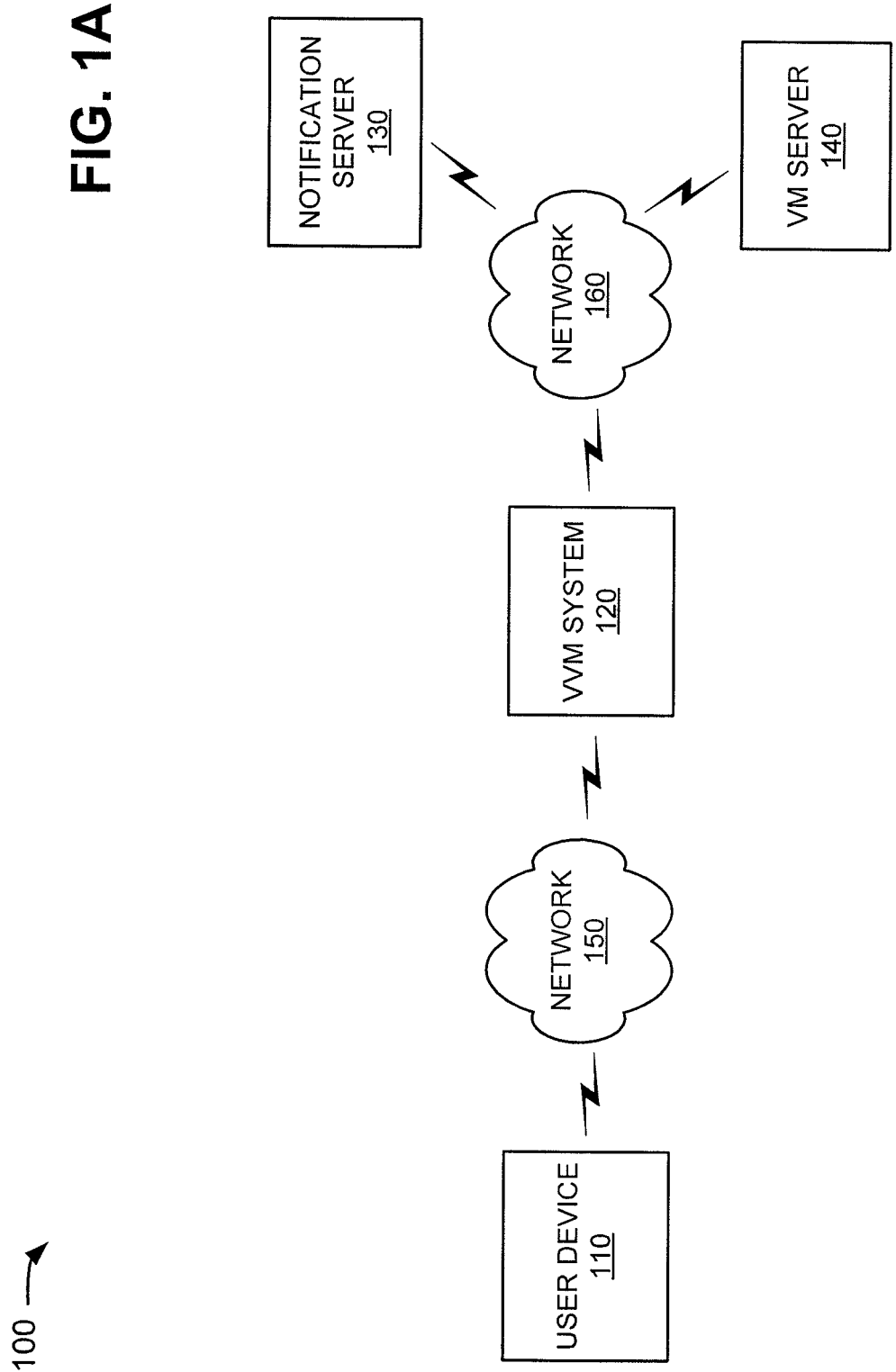

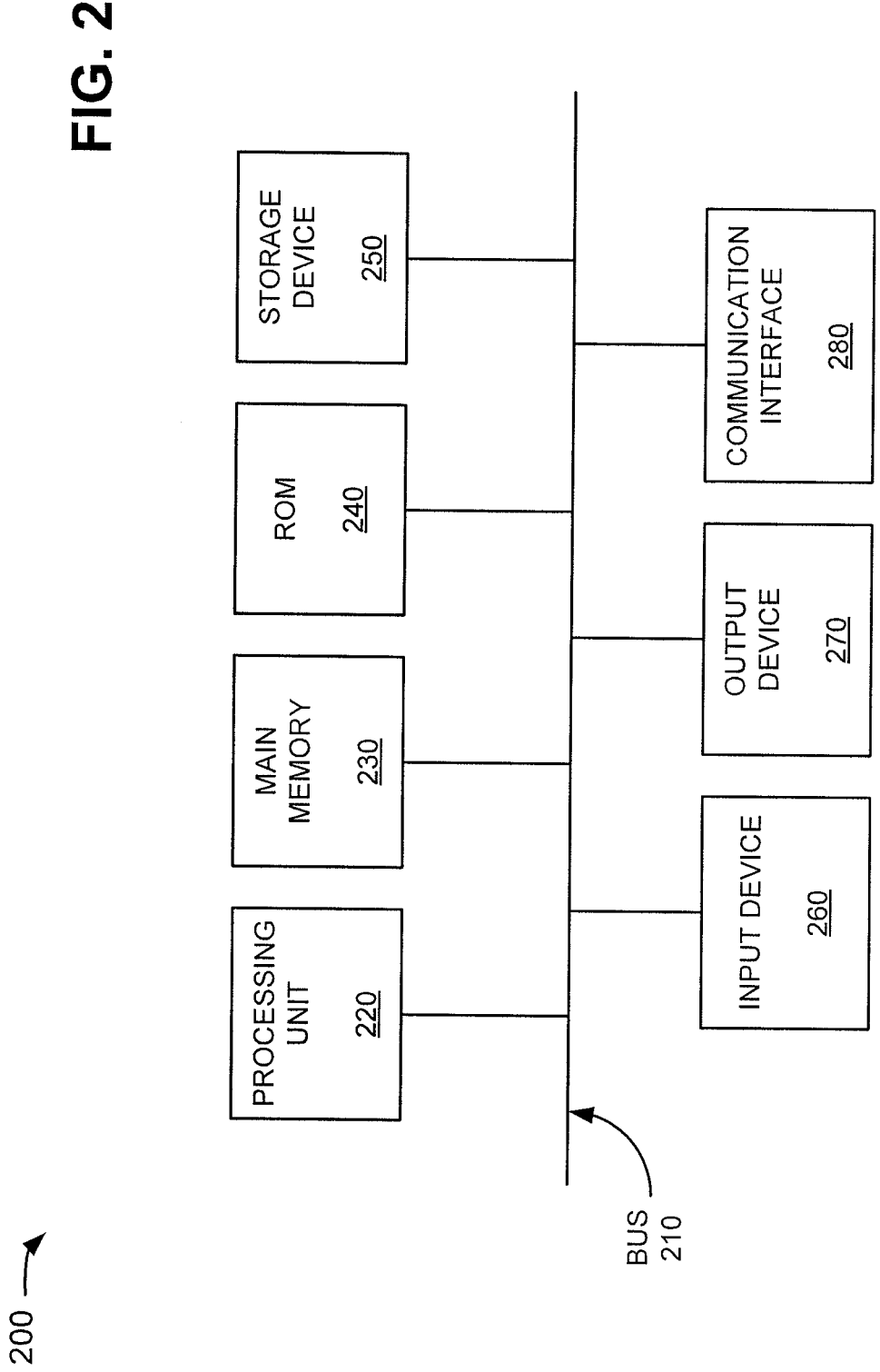

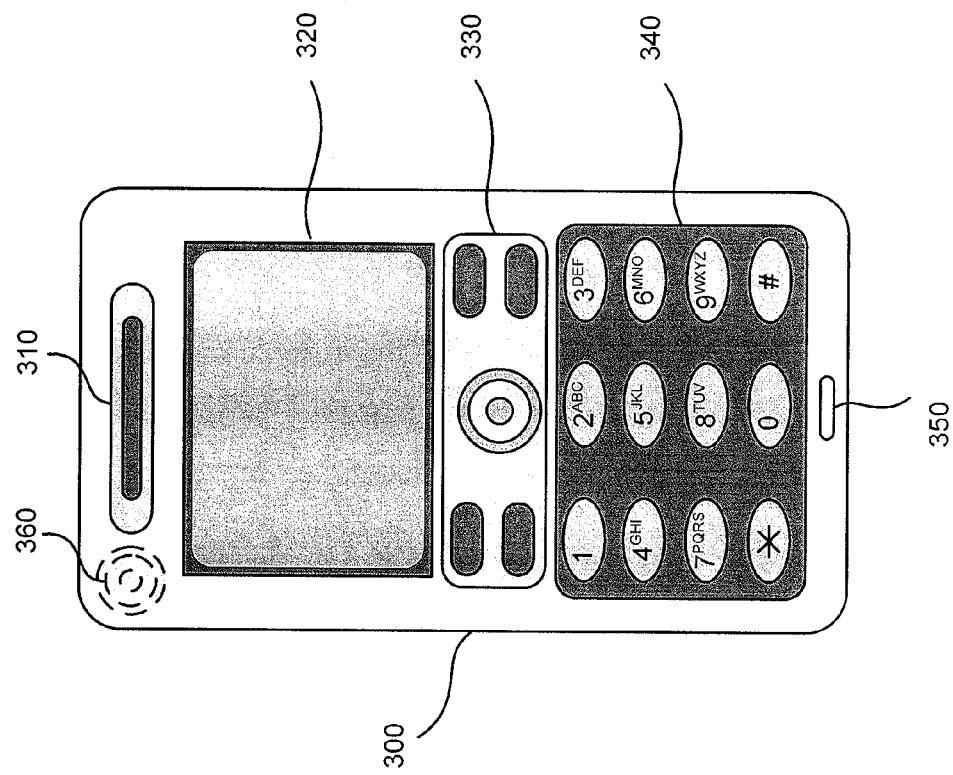

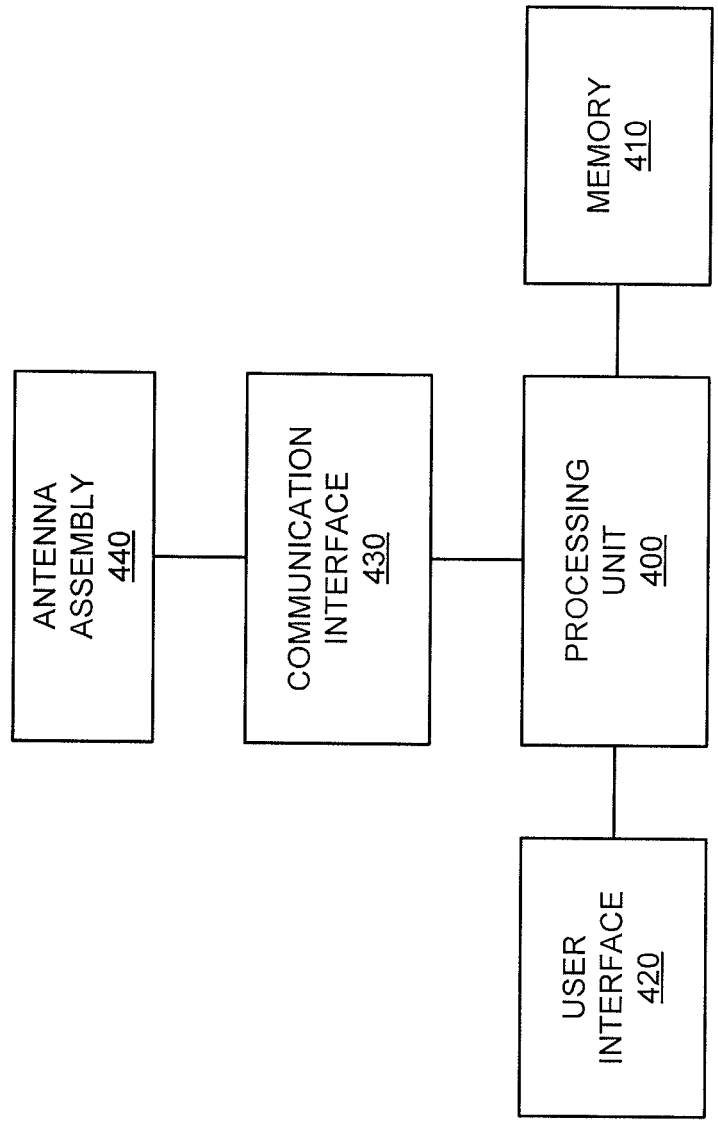

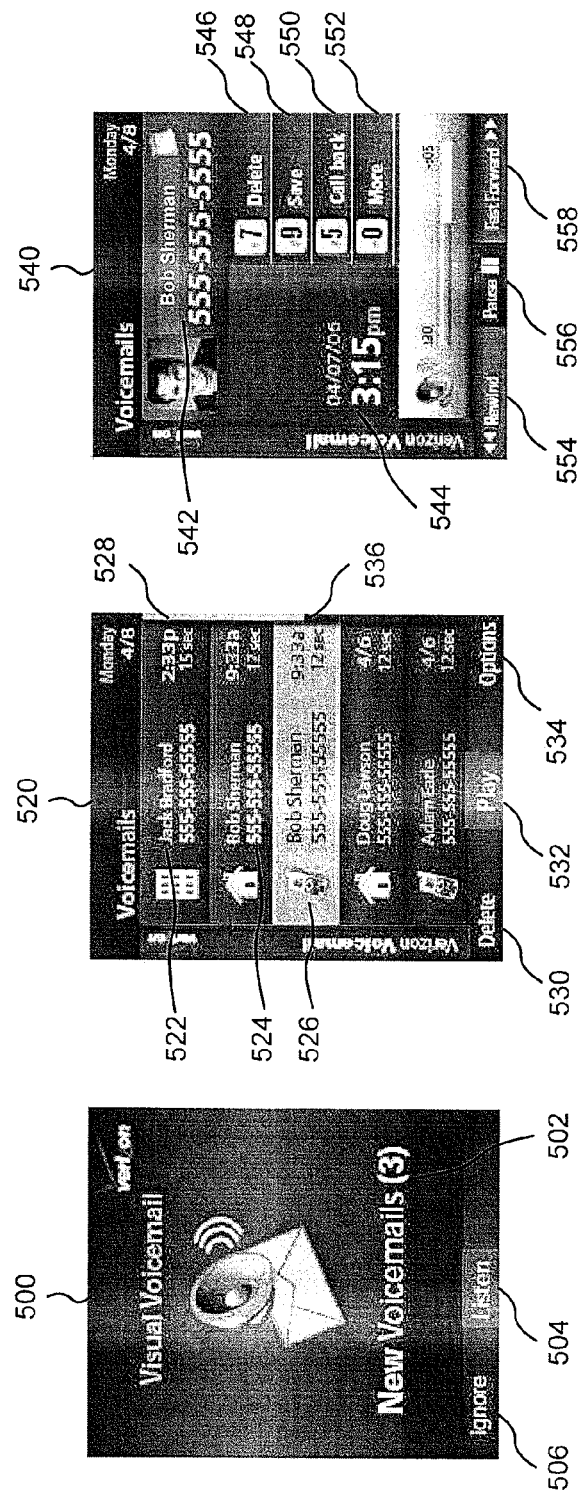

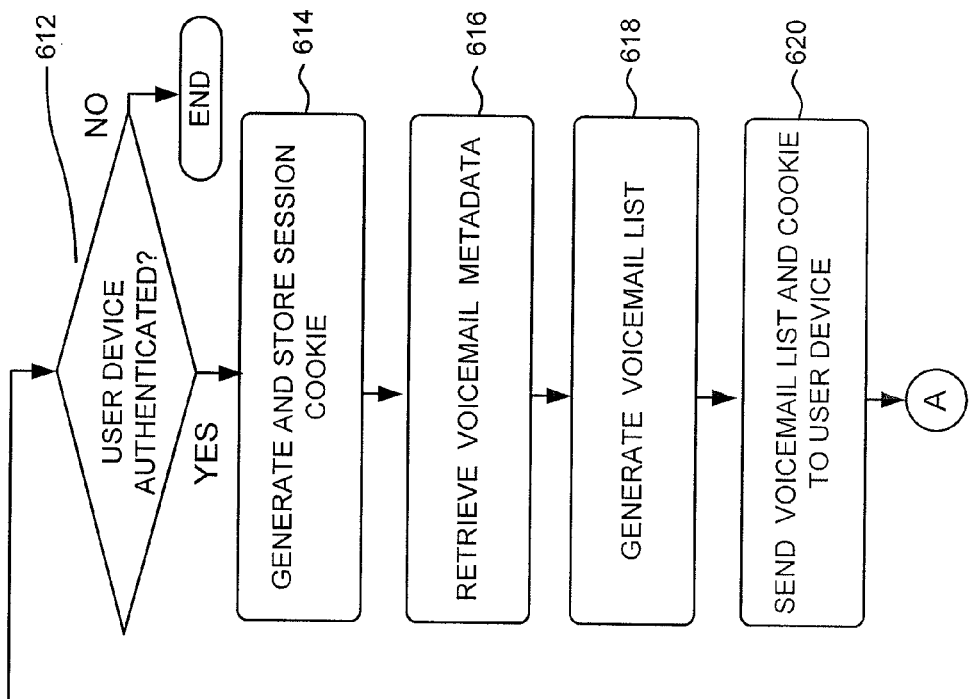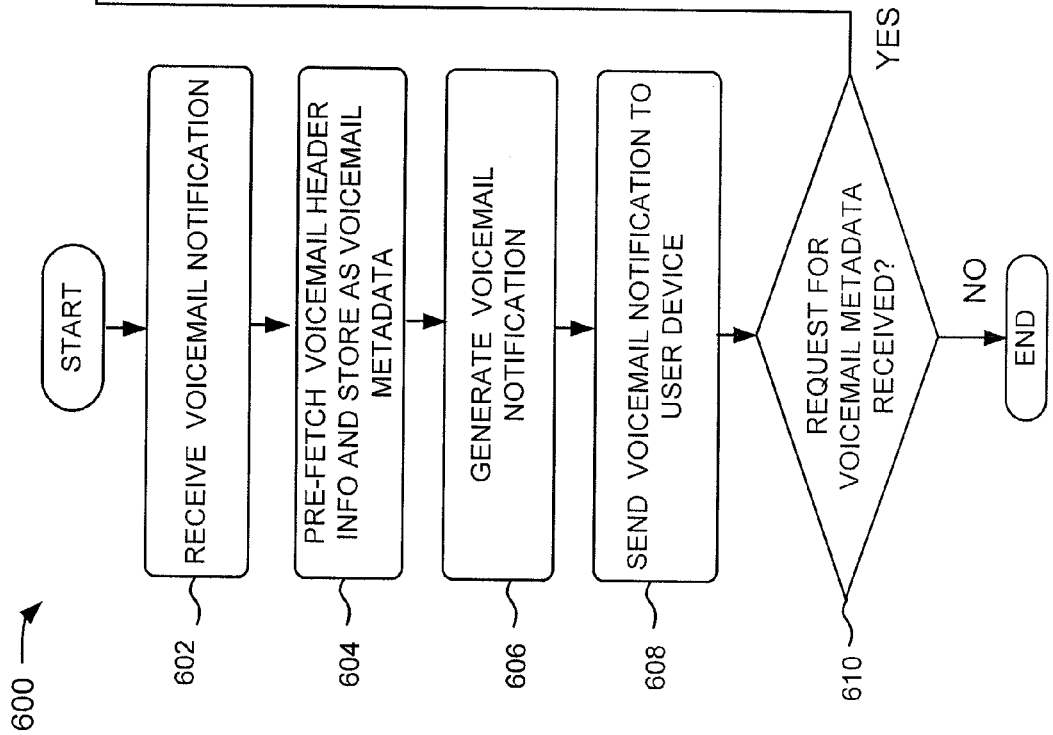
FIG. 6

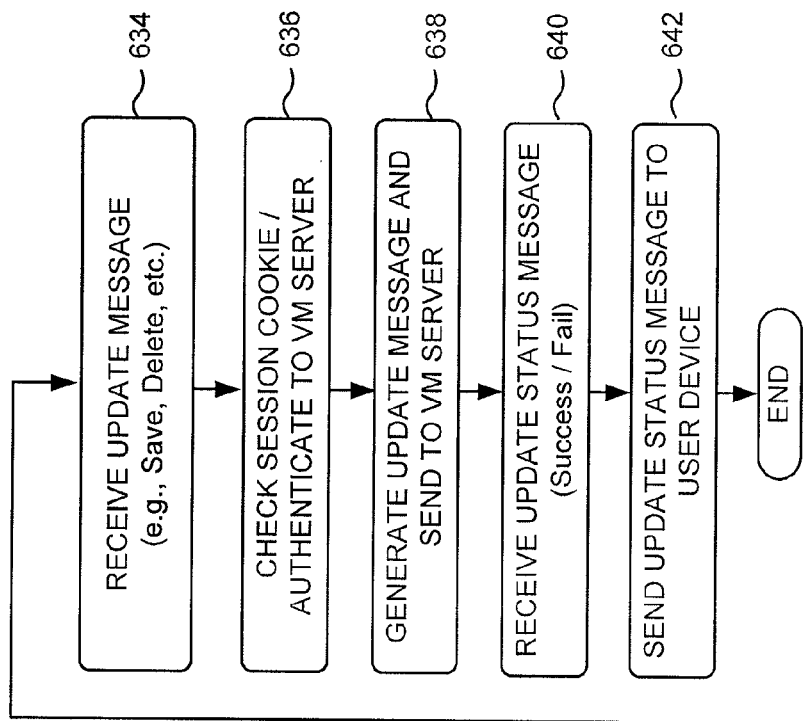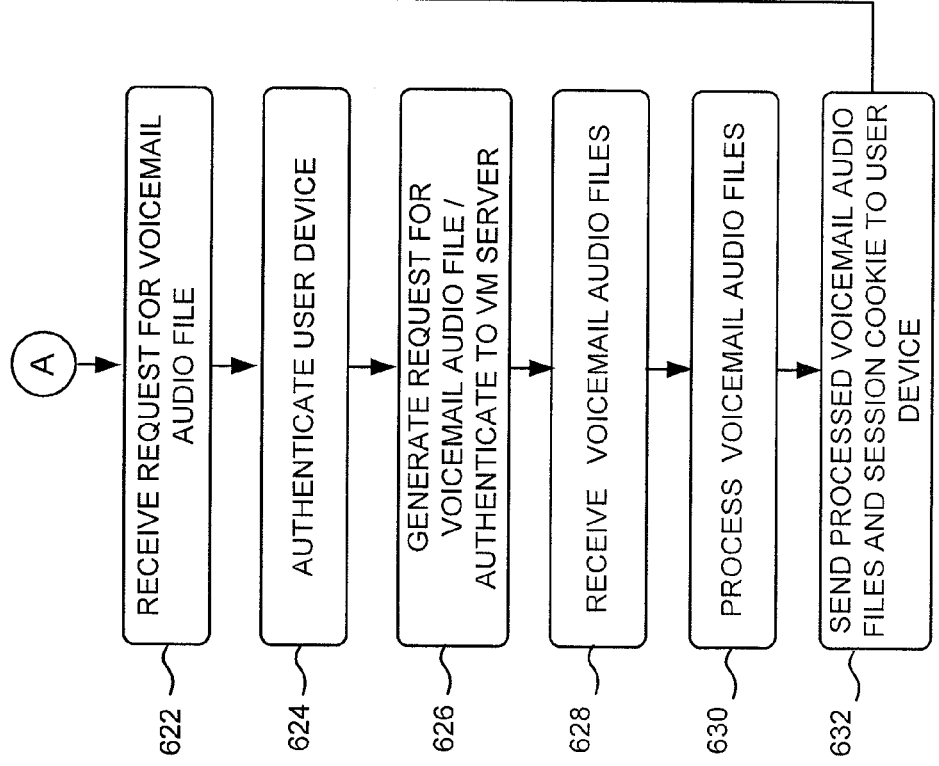
FIG. 7

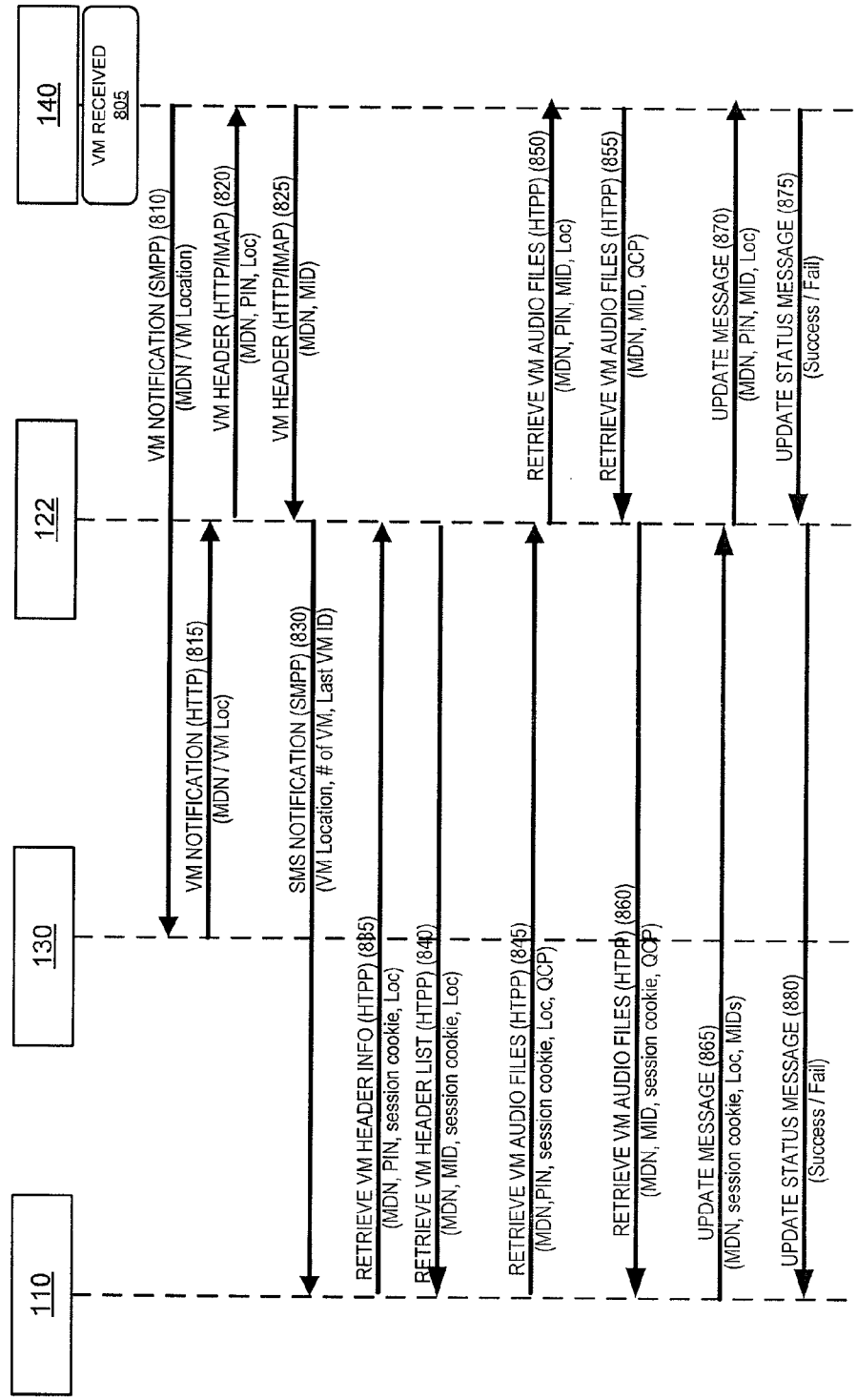

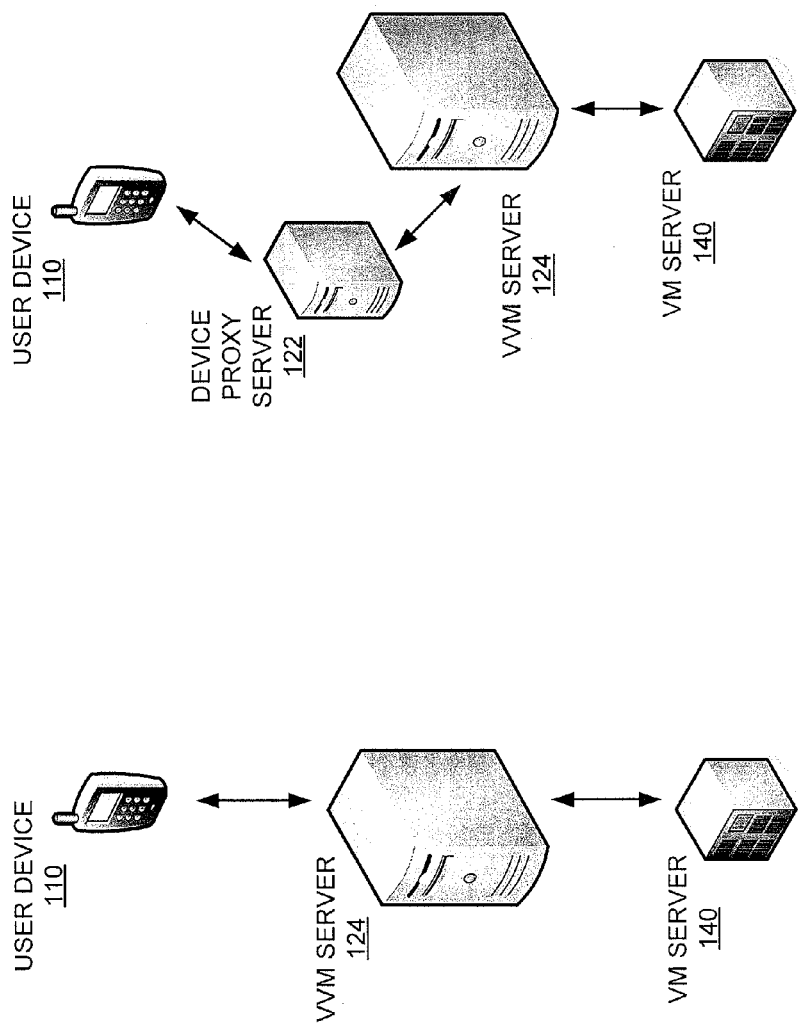

VISUAL VOICEMAIL PROXY SERVER

BACKGROUND

Visual voicemail (VVM) is a user friendly application that adds a visual aspect to managing voicemail messages. Visual voicemail may enable users to manage voicemail messages in an order of their choice, e.g., in a user-selected order rather than a sequential order. However, VVM may place greater demand on the limited processing capacity of user devices and may consume additional bandwidth that may reduce VVM system performance.

BRIEF DESCRIPTION OF THE DRAWINGS

FIG. 1A is a block diagram of an exemplary network in which systems and/or methods described herein may be implemented;

FIG. 2 is a diagram of exemplary components of one or more of the devices of FIGS. 1A and 1B;

FIG. 3 is a diagram of an exemplary user device of FIG. 1A;

FIG. 4 is a diagram of exemplary components of the user device of FIG. 3;

FIGS. 5A-5C are diagrams of exemplary user interfaces capable of being presented on the user device in FIG. 1A;

FIGS. 6 and 7 are flow charts of an exemplary process for proxying communications within the network of FIG. 1A;

FIG. 8 is an exemplary signal flow diagram for interacting through a device proxy server with voicemail information in the network of FIG. 1A;

FIG. 9A is a simplified diagram of an exemplary VVM system of FIG. 1B, without the device proxy server, interacting with a user device and/or voicemail server; and FIG. 9B is a simplified diagram of an exemplary VVM system of FIG. 1B, with the device proxy server, interacting with a user device and/or voicemail server.

DETAILED DESCRIPTION OF PREFERRED EMBODIMENTS

Figure 1B:
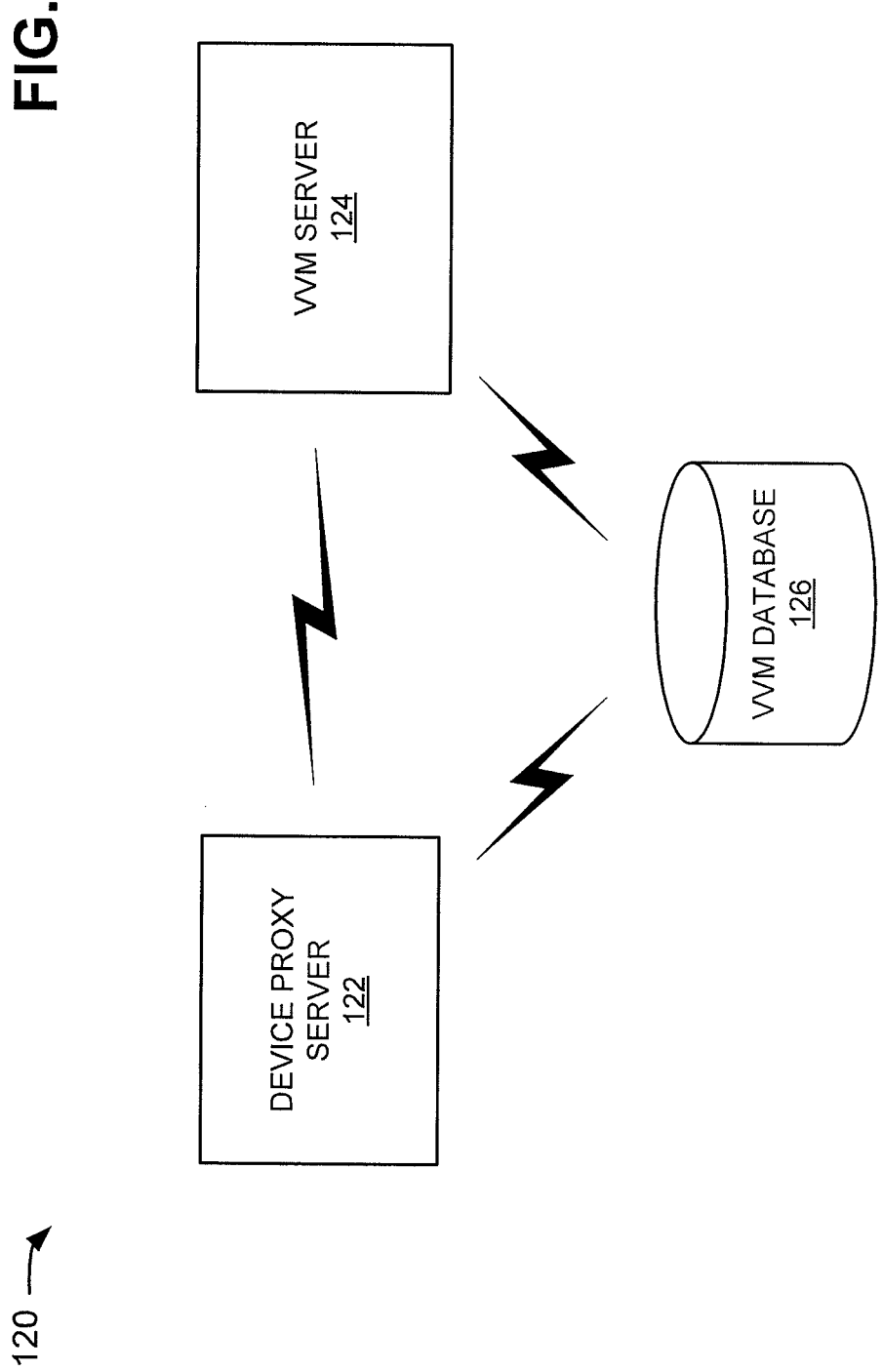
FIG. 1B is a block diagram of exemplary devices of the visual voicemail (VVM) system of FIG. 1A.

The following detailed description refers to the accompanying drawings. The same reference numbers in different drawings may identify the same or similar elements. Also, the following detailed description does not limit the invention.

Systems and/or methods described herein may provide a visual voicemail (VVM) system, which includes a device proxy server that may bridge communications and manage communications between the user device, VVM servers, voicemail (VM) servers and/or other devices. The device proxy server may act as an extension of the user device by managing communications to and/or from the user device by formatting communication protocols or data types that enable the user device and VM servers to efficiently communicate regardless of user device version and/or type and/or VM server message protocol. The device proxy server may also reduce user device processing and/or communication requirements (e.g., quantity and bandwidth of communications to and/or from the user device). The device proxy server may manage multiple communications with the backend VM servers and aggregate into a single communication with the user device, which may shift the bulk of communications from the more expensive and slower device-to-server and/or server-to-device communication to the less expensive and faster server-to-server communications. The device proxy server may also provide more secure communications with the user device and backend VM servers by reducing the quantity of less secure device-to-server communications and simplifying the authentication process by reducing the quantity of communications required to perform user device authentication.

In one implementation, the device proxy server may receive, from the user device, a request to retrieve voicemail information, may act as an extension of the user device by interacting with and managing communications with backend VM servers, may aggregate and format the voicemail content received from the backend VM servers, and may compress and deliver secure and customized voicemail information to the user device in a single, authenticated communication.

As used herein, the term "user" is intended to be broadly interpreted to include a user device or a user of a user device.

FIG. 1A is a diagram of an exemplary network 100 in which systems and/or methods described herein may be implemented. Network 100 may include a user device 110, a VVM system 120, a notification server 130 and a VM server 140 interconnected by networks 150 and 160. Components of network 100 may interconnect via wired and/or wireless connections. A single user device 110, VVM system 120, notification server 130, VM server 140, and networks 150 and 160 are illustrated in FIG. 1A for simplicity. In practice, there may be more or fewer user devices 110, VVM systems 120, notification servers 130, VM servers 140, and/or networks 150 and/or 160. Also, in some implementations, one or more of the devices of network 100 may perform one or more functions described as being performed by another one or more of the devices of network 100.

User device 110 may include any computation or communication device, such as a communication device that is capable of communicating with servers 120-140 via network 150. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices. In one implementation, user device 110 may enable a user to provision and utilize a VVM application and may receive notification when new voicemail arrives. For example, if user device 110 is a web-based device, user device 110 (e.g., via a web browser) may permit a user to view, listen to, and/or manage voicemail through a hypertext transfer protocol over secure socket layer (HTTPS) on the Internet. If user device 110 is a cell phone, user device 110 may implement a Java-based VVM application that may permit the user to view, listen to, and/or manage voicemail.

VVM system 120 may include one or more server devices, or other types of computation or communication devices, that gather, process, search, store, and/or provide information in a manner described herein. VVM system 120 may interface with user device 110 and may interface with other backend servers such as notification server 130 and VM server 140. VVM system 120 may respond to voicemail notifications and provide voicemail lists and voicemail audio to user device 110. VVM system 120 may format requests from user device 110 into a protocol that the backend VM servers 140 may understand, and may format, aggregate and/or compress data from different voicemail systems (e.g., provided by VM server 140), into a customized format that user device 110 can understand. VVM system 120 may provide or update a VVM application to user device 110, may keep track of user profile and user device version and/or type, may temporarily store (e.g. cache) certain content for reuse during a session for server and performance optimization and network load balancing. VVM 120 may authenticate user device 110 prior to enabling access to voicemail boxes via VVM system 120 and/or VM server 140.

Notification server 130 may include one or more server devices, or other types of computation or communication devices, that provide voicemail notifications to VVM system 120 and/or user device 110. In one implementation, notification server 130 may receive, from VM server 140, a new voicemail notification that includes the mobile directory number (MDN) associated with user device 110 and the voicemail location, associated with VM server 140, where the voicemail is stored. Notification server 130 may provide a notification to VVM system 120 to enable the retrieval of a list of voicemails from VM server 140 and to alert user device 110 of the presence of voicemail.

VM server 140 may include one or more server devices, or other types of computation or communication devices, that store and process voicemail. VM server 140 may provide voicemail boxes for home, office, or wireless devices (e.g., user device 110), and may provide a service wide directory for voicemail box location lookup. The service wide directory may include telephone numbers, locations of voicemail boxes, and/or other information associated with home, office, or wireless devices that may be accessed by VVM system 120.

Networks 150 and 160 may each include a local area network (LAN), a wide area network (WAN), a metropolitan area network (MAN), a telephone network, such as the Public Switched Telephone Network (PSTN), a cellular network, such as the Public Land Mobile Network (PLMN), an intranet, the Internet, a fiber optic-based network, or a combination of networks.

FIG. 1B is a diagram that may correspond to an exemplary VVM system 120 of FIG. 1A and may include a device proxy server 122, a VVM server 124 and a VVM database 126 interconnected by a wire or wireless network connection. In practice, there may be more or fewer device proxy servers 122, VVM servers 124, and/or VVM databases 126. Also, in some implementations, one or more of the devices of VVM system 120 may perform one or more functions described as being performed by another one or more of the devices of VVM system 120 and/or network 100. For example, device proxy server 122, VVM server 124 and/or VVM database 126 could be integrated into a single device that performs all or some of the functions that the devices performed when interconnected individually or in some combination thereof.

Device proxy server 122 may include a device that interfaces directly with user device 110 and bridges communications between user device 110 and VVM server 124 and/or VM server 140. Device proxy server 122 may manage and optimize communications on behalf of user device 110, which may reduce the bandwidth and quantity of communications to and/or from user device 110, and may reduce the demand for user device 110 processing capacity and time needed to access and manage voicemail. Additionally, device proxy server 122 may authenticate user device 110 before enabling access to voicemail. Alternatively, device proxy server 122 may convert requests from user device 110 into a format that backend VM servers 140 may understand, and may format, aggregate and/or compress data from VM server 140, into a customized format that user device 110 can understand. Device proxy server 122 may direct VVM server 124 to provide or update a VVM application to user device 110, may monitor user profiles and user device versions and/or types, and/or may temporarily store (e.g. cache) certain content for reuse during a voicemail communication session for server and performance optimization and/or network load balancing. Also, in some implementations, device proxy server 122 may perform one or more functions described as being performed by the VVM server 124 and/or VVM database 126.

VVM server 124 may include a device that provides the VVM application and/or other data to device proxy server 122 when prompted. Device proxy server 122 may send VVM application and/or update data to user device 110 when necessary to maintain user device 110 version control. VVM server 124 may store, retrieve and/or manage user device 110, user profile and other VVM application information in VVM database 126 when directed by device proxy server 122. VVM server 124 may receive voicemail notifications from device proxy server 122 and/or retrieve voicemail information from VM server 140 and may temporarily store (e.g., cache) voicemail information in VVM database 126 for later retrieval when directed by device proxy server 122. Also, in some implementations, VVM server 124 could be integrated with device proxy server 122 and/or VVM database 126 into a single device.

VVM database 126 may include a device that stores VVM application and/or update information for retrieval by device proxy server 122 and/or VVM server 124. The VVM database 126 may be directed, by device proxy server 122 and/or VVM server 124, to temporarily store authentication information such as the user's (e.g., the user of user device 110) personal identification number (PIN), mobile directory number (MDN), voicemail identifier information, message identifiers (MID), username, password, session cookie, etc. The VVM database 126 may temporarily and/or non-persistently store information (e.g., authentication information, voicemail metadata, etc.) such that the information may be cached for the duration of a voicemail session and/or for a predetermined period of time (e.g., 45 minutes). Metadata, as defined herein, may include any information relating to and/or associated with a voicemail. At the conclusion of a voicemail session, or upon the expiration of the predetermined period of time, VVM database 126 may purge, erase and/or otherwise expunge the cached information. Additionally, VVM database 126 could be integrated with device proxy server 122 and/or VVM server 124 into a single device.

Although not shown in FIG. 1B, VVM system 120 may include a variety of other devices, such as a self-provisioning server, a transcoding server, an authentication server, a gateway server, etc. The self-provisioning server may enable a new VVM user to download and setup the VVM application on user device 110. The authentication server, the transcoding server, etc., may be directed by device proxy server 122 to convert content (e.g., voicemail lists, voicemail audio files, etc.) into a format that may be readable by user device 110. In one implementation, the transcoding server may transcode an audio file into a format (e.g., WAV, MP3, QCP, etc.) that may be received by device proxy server 122 and aggregated, formatted and compressed for a customized single communication to user device 110. In another implementation, device proxy server 122 may authenticate user device 110 before validating access to the VVM system 120. In yet another implementation, device proxy server 122 may direct user device 110 to the authentication server for validation of user device 110 (e.g., via a login and/or password) to validate access to the VVM system 120. The gateway server may provide the primary security firewall for the VVM system 120 and may govern communications in and/or out of VVM system 120.

FIG. 2 is an exemplary diagram of device 200 that may correspond to device proxy server 122, VVM server 124, notification server 130, and/or VM server 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessor, an application-specific integrated circuit (ASIC), a field programmable gate array (FPGA), or another type of processing unit that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive or a type of flash memory.

Input device 260 may include a mechanism that permits an operator to input information into device 200, such as a keyboard, a mouse, a pen, a button, voice recognition and/or biometric mechanisms, a touch screen, etc. Output device 270 may include a mechanism that outputs information to the operator, including a display, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a physical or logical memory device. A logical memory device may include a space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, additional, different, or differently arranged components than depicted in FIG. 2. In still other implementations, one or more components of device 200 may perform one or more tasks described as being performed by one or more other components of device 200.

FIG. 3 depicts a diagram of an exemplary user device 110, which includes a housing 300, a speaker 310, a display 320, control buttons 330, a keypad 340, a microphone 350, and/or a camera 360. Housing 300 may include a chassis on which some or all of the components of user device 110 are mechanically secured and/or covered. Speaker 310 may include a component to receive input electrical signals from the user device and transmit audio output signals which communicate audible information to a user of user device 110.

Display 320 may include a component to receive input electrical signals and present a visual output in the form of two-dimensional text, images, videos and/or combinations of text and images which communicate visual information to the user of user device 110. In one implementation, display 320 may display text input into user device 110, text, images, video, and/or graphics received from another device, and/or information regarding incoming or outgoing calls or text messages, emails, media, games, phone books, address books, the current time, etc.

Control buttons 330 may include one or more buttons that accept, as input, mechanical pressure from the user (e.g., the user presses a control button or combinations of control buttons) and may send electrical signals to processing unit 220 that may cause user device 110 to perform one or more operations. For example, control buttons 330 may be used to cause user device 110 to transmit information. Keypad 340 may include a standard telephone keypad or another arrangement of keys.

Microphone 350 may include a component to receive audible information from the user and send, as output, an electrical signal that may be stored by user device 110, transmitted to another user device, or cause the device to perform one or more operations. Camera 360 may be provided on a back side of user device 110, and may include a component to receive, as input, analog optical signals (e.g., a visual scene, visage, event, etc.) and send, as output, a digital image or video that can be, for example, viewed on the display 310, stored in the memory of user device 110, discarded and/or transmitted to another user device 110.

Although FIG. 3 shows exemplary components of user device 110, in other implementations, user device 110 may contain fewer, additional, different, or differently arranged components than depicted in FIG. 3. In still other implementations, one or more components of user device 110 may perform one or more tasks described as being performed by one or more other components of user device 110.

FIG. 4 is a diagram of exemplary components of user device 110. As shown in FIG. 4, user device 110 may include a processing unit 400, a memory 410, a user interface 420, a communication interface 430, and/or an antenna assembly 440.

Processing unit 400 may include a processor, a microprocessor, an ASIC, a FPGA, or the like. Processing unit 400 may control operation of user device 110 and its components. In one implementation, processing unit 400 may control operation of components of user device 110 in a manner described herein. Memory 410 may include a RAM, a ROM, and/or another type of memory to store data and/or instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.); a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., visual voicemail information); a vibrator to cause user device 110 to vibrate; and/or a camera (e.g., camera 360) to receive video and/or images.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 150).

As described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 110, in other implementations, user device 110 may contain fewer, additional, different, or differently arranged components than depicted in FIG. 4. In still other implementations, one or more components of user device 110 may perform one or more tasks described as being performed by one or more other components of user device 110.

FIGS. 5A-5C are diagrams of exemplary user interfaces capable of being presented on user device 110 in FIG. 1A. User interfaces depicted in FIGS. 5A-5C (collectively referred to as "the user interfaces"), may include a component to provide graphical user interfaces (GUIs) or non-graphical user interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., display 320).

As illustrated in FIG. 5A, a user interface 500 and user interface data elements (hereinafter, referred to as "data elements") 502-506 may provide a voicemail notification if a voicemail is received by user device 110. User interface 500 may include an object 502 that identifies the number of voicemails available to user device 110 (e.g., as shown in FIG. 5A, user interface 500 may indicate that three voicemails have been received). The user (e.g., the user of user device 110) may listen to the voicemails (e.g., by selecting a "Listen" button 504), or may ignore the voicemails (e.g., by selecting an "Ignore" button 506).

In one example, if the user of user device 110 selects the "Listen" button 504, a user interface 520 (FIG. 5B) may be presented by user device 110. User interface 520 and data elements 522-536 may provide a list of voicemail identifier information and associated information (e.g., a name of the caller that left the voicemail 522 (hereinafter referred to as, "caller"), a telephone number of the caller 524, an icon indicating a device associated with the caller 526, a time of receipt of the voicemail and/or a duration associated with the voicemail 528, etc.). In one exemplary implementation, user interface 520 may provide the list of voicemail with the most recent (or most urgent) voicemail displayed at the top of the list.

The user (e.g., the user of user device 110) may interact with user interface 520. For example, the user may scroll up or down the list of voicemail, may select one or more voicemail to listen to, may call back a caller, may delete a voicemail, may save a voicemail, may reorder the list, may flag a particular item in the list, etc. The user may also reply to a voicemail by sending a SMS message, an email, or a recorded message from user device 110 to the caller. In one example, the user may delete a voicemail (e.g., by selecting a "Delete" button 530), may listen to a voicemail (e.g., by selecting a "Play" button 532), and/or may access other options (e.g., by selecting an "Options" button 534). If the user selects the "Options" button 534, user device 110 may provide the user with a variety of voicemail management options (e.g., a call back option, a save option, a reply option, a forward option, a compose option, etc.).

In another example, if the user (e.g., the user of user device 110) selects (e.g., highlights) one of the voicemails 536 (e.g., the voicemail from "Bob Sherman") and selects the "Play" button 532, a user interface 540 and data elements 542-558 (FIG. 5C) may by displayed by user device 110. User interface 540 may include a name, an image and/or a telephone number (e.g., "555-555-5555") 542 associated with the caller (e.g., "Bob Sherman). User interface 540 may also include a time and/or date (e.g., "Apr. 7, 2006" at "3:15 PM") 544 associated with the voicemail, an option to delete the voicemail 546 (e.g., "7—Delete"), an option to save the voicemail 548 (e.g., "9—Save"), an option to call the caller 550 (e.g., "5—Call back") and an option to view additional features and/or functions 552 (e.g., "0—More"). The user may rewind the voicemail (e.g., by selecting a "Rewind" button 554), may pause the voicemail (e.g., by selecting a "Pause" button 556), and/or may fast forward the voicemail (e.g., by selecting a "FF" button 558).

Although user interfaces 500-540 and data elements 502-558 depict a variety of information, in other implementations, user interfaces 500-540 and data elements 502-558 may depict less, additional, different, or differently arranged information than depicted in FIGS. 5A-5C. Furthermore, although certain features associated with the VVM application have been described above in connection with FIGS. 5A-5C, in other implementations, the VVM proxying operation may include additional or different features than described above in connection with FIGS. 5A-5C.

FIGS. 6 and 7 are flow charts of an exemplary process 600 depicting a proxying operation according to the implementations described herein. In one implementation, some or all of process 600 may be performed by device proxy server 122 interfacing with user device 110, VVM server 124, VVM database 126 and/or VM server 140. In another implementation, some or all of process 600 may be performed by one or more devices separate from or in combination with device proxy server 122.

Process 600 of FIG. 6 may begin when a voicemail notification is received (block 602). For example, when a voicemail, intended for user device 110, is received by VM server 140, VM server 140 may generate a voicemail notification. VM server 140 may send the voicemail notification to notification server 130. Notification server 130 may receive the voicemail notification from VM server 140 and notification server 130 may notify device proxy server 122 of the voicemail. Device proxy server 122 may receive the voicemail notification from notification server 130. In one implementation, the voicemail notification may include information associated with user device 110 (e.g., user device 110 MDN) and information identifying the voicemail location (e.g., the storage location within the memory of VM server 140 from where the voicemail may be retrieved).

Voicemail header information may be pre-fetched and stored in VVM database 126 as voicemail metadata (block 604). For example, device proxy server 122 may generate a request to pre-fetch the voicemail header information upon receiving the voicemail notification from notification server 130. The request for voicemail header information may include information associated with user device 110, such as user device 110 MDN, a PIN, username and/or password (e.g., retrieved from VVM database 126) and/or voicemail location (e.g., the storage location within VM server 140 memory). Device proxy server 122 may send the request for voicemail header information to VM server 140. VM server 140 may receive the request for voicemail header information and VM server 140 may authenticate the request using the information associated with user device 110, by comparing, for example, the received information associated with the user device to information stored in VM server 140 memory. If VM server 140 authenticates the request, VM server 140 may send the voicemail header information to device proxy server 122. The voicemail header information may include information associated with user device 110 (e.g., user device 110 MDN, a PIN, username and/or password), message identifiers (MID), and/or voicemail identifier information, such as name and/or telephone number of caller, voicemail time and/or date, etc.). Device proxy server 122 may receive the voicemail header information and device proxy server 122 may temporarily store (e.g., cache) the voicemail header information, in VVM database 126, as voicemail metadata.

A voicemail notification, intended for user device 110, may be generated (block 606). For example, device proxy server 122 may generate a voicemail notification formatted specifically for user device 110 version and/or type. In one implementation, the voicemail notification may include the voicemail location (e.g., the storage location within VM server 140 memory), the number of voicemails received, and the telephone number and/or MID of the last (e.g., most recent) voicemail received. In other implementations, the voicemail notification may include different or additional information.

Device proxy server 122 may aggregate additional components into the formatted voicemail notification that enable a visual voicemail user interface (e.g., visual voicemail user interface 500 of FIG. 5A) to be generated. The voicemail notification may be aggregated, by device proxy server 122, into a single file. In one implementation, device proxy server 122 may make one or more data calls and/or communications with VVM server 124 and/or VM server 140 to retrieve, for example, information to assemble a voicemail notification user interface (e.g., data elements 502-506 of user interface 500 of FIG. 5A) that user device 110 may present. Device proxy server 122 may aggregate data elements 502-506 of user interface 500 of FIG. 5A, (e.g., retrieved via data calls to and/or from VVM server 124 and/or VM server 140), with the formatted voicemail notification (e.g., voicemail location, number of voicemails and the telephone number of the last voicemail received) into a single file that, once received, user device 110 may understand and/or display.

The voicemail notification may be sent to user device 110 (block 608) so that the presence of voicemail is made apparent to the user of user device 110. For example, device proxy server 122 may generate the voicemail notification, as described above, and device proxy server 122 may send the voicemail notification to user device 110. User device 110 may receive the voicemail notification and user device 110 may display a user interface (e.g., user interface 500 of FIG. 5A) enabling the user to view the number of voicemails received (e.g., "Voicemails (3)" 502), to listen to voicemail 504, and/or ignore the voicemail 506.

User device 110 may send, to device proxy server 122, a request to retrieve voicemail metadata. The request, by user device 110, for voicemail metadata may include information identifying user device 110 (e.g., user device 110 MDN, PIN, username, password and/or a session cookie) and/or voicemail location. The session cookie, which has a predetermined period of expiration (e.g., 45 minutes), may be generated by device proxy server 122 during an authentication procedure and/or login by user device 110 device. After authentication and/or login, device proxy server 122 may send a new session cookie to user device 110.

As shown in FIG. 6, if no request for voicemail metadata is received (block 610—NO), then process 600 ends and user device 110 may not receive voicemail metadata. If, on the other hand, a request for voicemail metadata is received (block 610—YES), then user device 110 may be authenticated (block 612). For example, device proxy server 122 may receive a request, from user device 110, for voicemail metadata and device proxy server 122 may determine whether the session cookie is valid (e.g., is included in the request, has not expired and/or is otherwise acceptable). If device proxy server 122 validates the session cookie then device proxy server 122 may authorize user device 110 to receive voicemail metadata. If, however, device proxy server 122 determines that the session cookie is invalid (e.g., is not included in the request, has expired and/or is otherwise unacceptable), device proxy server 122 may then determine whether the information associated with user device 110 (e.g., MDN, PIN, username, and/or password) is valid. If the information associated with user device 110 is determined to be invalid, then process 600 ends and device proxy server 122 may not send voicemail metadata to user device 110. If, however, device proxy server 122 validates the information associated with user device 110, then device proxy server 122 may authorize user device 110 to receive voicemail metadata.

In another implementation, the device proxy server 122 may direct an authentication server to perform the validation of the information associated with user device 110 (e.g., MDN, PIN, username, and/or password). If authentication server determines that the information associated with user device 110 is valid, the authentication server may send a validation notice to device proxy server 122. Device proxy server 122 may receive the validation notice and may authorize user device 110 to receive voicemail metadata. If the authentication server determines that the information associated with user device 110 is invalid, then process 600 ends and device proxy server 122 may not send voicemail metadata to user device 110.

A new session cookie may be generated and temporarily stored (e.g., cached) for simplified authentication in future sessions (block 614), and voicemail metadata may be retrieved for user device 110 (block 616). For example, device proxy server 122 may authenticate user device 110 and device proxy server 122 may generate a new session cookie (e.g., if one is not already stored in VVM database 126) and temporarily store the session cookie in VVM database 126. Device proxy server 122 may retrieve, from VVM database 126, the voicemail metadata. In one implementation, the session cookie may be valid for the entire session and device proxy server 122 may not generate a new session cookie (e.g., if one is already stored in VVM database 126).

A voicemail list may be generated for user device 110 (block 618). For example, device proxy server 122 may retrieve the voicemail metadata and may generate a voicemail list formatted specifically for user device 110 version and/or type. The voicemail list may include information associated with user device 110 (e.g., user device 110 MDN) and voicemail identifier information (e.g., MID, name and/or telephone number of caller, time and/or date of the voicemail, etc.). Device proxy server 122 may also aggregate additional components into the formatted voicemail list that enable a visual voicemail user interface (e.g., the visual voicemail user interface 520 of FIG. 5B) to be generated. The voicemail list may be aggregated, by device proxy server 122, into a single file. In one implementation, device proxy server 122 may make one or more data calls and/or communications with VVM server 124 and/or VM server 140 to retrieve, for example, information to assemble the voicemail list user interface (e.g., data elements 522-536 of user interface 520 of FIG. 5B) that user device 110 may present. For example, device proxy server 122 may aggregate user interface 520 and data elements 522-536 of FIG. 5B, (e.g., retrieved via data calls to and/or from VVM server 124 and/or VM server 140), with the formatted voicemail list (see above) into a single file that, once received, user device 110 may understand and/or display.

The voicemail list, together with the session cookie, may be sent to user device 110 so that the voicemail list can be displayed by user device 110 (block 620). For example, device proxy server 122 may generate the voicemail list and may send, in a single communication, the voicemail list to user device 110. User device 110 may receive the voicemail list and may display the voicemail list (e.g., as illustrated by user interface 520 of FIG. 5B) enabling the user (e.g. user of user device 110) to view the name of the caller 522, telephone number of caller 524, type of device of the caller 526 (e.g., home, office and/or mobile), and/or the time and duration of the voicemail 528. User device 110 may also enable the user to highlight the voicemail on the list 536 and manage voicemail by deleting the highlighted voicemail 530, playing the highlighted voicemail 532 and/or viewing other options (e.g., save, reply, forward, call back, call forward, etc.).

User device 110 may receive the voicemail list and user device 110 may compare the voicemail list to the voicemail saved in user device 110 memory. User device 110 may determine that voicemail audio files are desired to be retrieved (e.g., pre-fetched) and user device 110 may send, to device proxy server 122, a request to retrieve voicemail audio files. The request, by user device 110, for voicemail audio files may include information associated with user device 110 (e.g., user device 110 MDN, PIN, username, password, and/or session cookie), voicemail location (e.g., storage location within VM server 140 memory), and/or desired audio file format (e.g., WAV, MP3, QCP, etc.).

As shown in FIG. 7, if a request for voicemail audio files is received (block 622), then user device 110 may be authenticated (block 624). If no request for voicemail audio files is received, then process 600 may end. For example, if device proxy server 122 receives, from user device 110, a request for voicemail audio files, device proxy server 122 may authenticate user device 110 by validating the session cookie received from user device 110. If device proxy server 122 determines that the session cookie is invalid, then device proxy server 122 may authenticate user device 110 based on information associated with user device 110 (e.g., MDN, PIN, username and/or password) received from user device 110. If the device proxy server 122 determines that it cannot authenticate user device 110, then process 600 ends and user device 110 may not be authorized to receive voicemail audio files. If, however, device proxy server 122 authenticates user device 110, either by the session cookie or by information associated with user device 110 (e.g., MDN, PIN, username and/or password), then device proxy server 122 may authorize user device 110 to receive voicemail audio files.

A request for voicemail audio files may be generated (block 626) and sent to VM server 140. For example, device proxy server 122 may generate a request for voicemail audio files and send the request to VM server 140. The request for voicemail audio files may include information associated with user device 110 (e.g., user device 110 MDN, PIN, username, and/or password), voicemail identifier information (e.g., MID, name and/or telephone number of caller, time and/or date of the voicemail, etc.) and/or voicemail location (e.g., storage location within VM server 140 memory). VM server 140 may receive a request for voicemail audio files and VM server 140 may authenticate user device 110 by validating the information associated with user device 110 (e.g., user device 110 MDN, PIN, username, and/or password) received against information associated with user device 110 stored in VM server 140 memory. VM server 140 may retrieve voicemail audio files and may send the voicemail audio files to device proxy server 122. If, however, VM server 140 cannot validate user device 110, process 600 may end and VM server 140 may not retrieve the voicemail audio files.

As shown in FIG. 7, the voicemail audio files may be received and processed (block 628 and block 630). For example, device proxy server 122 may receive the voicemail audio files and may format the voicemail files specifically for user device 110 version and/or type. The formatted voicemail audio files may include information associated with user device 110 (e.g., user device 110 MDN), audio file format (e.g., QCP, WAV, MP3, etc.) and/or voicemail identifier information (e.g., MID, name and/or telephone number of caller, time and/or date of the voicemail, etc.). Device proxy server 122 may also aggregate additional components into the formatted voicemail audio files that enable a visual voicemail user interface (e.g., visual voicemail user interface 540 of FIG. 5C) to be generated. The voicemail audio files may be aggregated, by device proxy server 122, into a single file. In one implementation, device proxy server 122 may make one or more data calls and/or communications with VVM server 124 and/or VM server 140 to retrieve, for example, information to assemble a visual voicemail user interface (e.g., data elements 542-558 of user interface 540 of FIG. 5C) that user device 110 may present. Additionally, device proxy server 122 may aggregate user interface 540 and data elements 542-558 of FIG. 5C with the formatted voicemail audio files, information associated with user device 110 (e.g., device 110 MDN), audio file format (e.g., WAV, MP3 and/or QCP etc.), and voicemail identifier information (e.g., MID, name and/or telephone number of caller, time and/or date of the voicemail, etc.) and a session cookie into a single processed audio file that user device 110 may understand and/or display.

The processed voicemail audio file, which may include the session cookie, may be sent to user device 110 (block 632). For example, device proxy server 122 may generate the processed voicemail audio file and may send, in a single communication, the processed voicemail audio file to user device 110. User device 110 may receive the processed voicemail audio file and user device 110 may display a user interface (e.g., user interface 540 of FIG. 5C) enabling the user (e.g., the user of user device 110) to view and manage voicemail during or after playback. The user may view the name, image and/or telephone number of the caller 542 as well as the date and/or time of the voicemail. The user may interact with user interface 540 to manage the playback of the voicemail by selecting "Rewind" 554 to go back to a previous spot in the voicemail, "Pause" 556 to stop playback or "Fast Forward" 558 to go forward to a subsequent spot in the voicemail. The user may further manage the voicemail by selecting "7" to delete the voicemail, "9" to save the voicemail, "5" to call back the caller and/or "0" for additional voicemail management options (e.g., reply, forward, call forward, etc.).

The user may take action to manage the voicemail (e.g., save, delete, forward, reply, etc.). User device 110 may send an update message to device proxy server 122. The update message may include an indication of the action taken by the user to manage the voicemail (e.g., save, delete, reply, forward, etc.) along with information associated with user device 110 (e.g., user device 110 MDN), session cookie, voicemail location (e.g., storage location of voicemail within VM server 140 memory) and voicemail identifier information (e.g., name and/or telephone number of caller, voicemail date and/or time, etc.).

As further shown in FIG. 7, an update message may be received from user device 110 (block 634) to manage and/or synchronize voicemail with the VM server 140. If an update message is received, user device 110 may be authenticated (block 636). If an update message is not received, then process 600 may end. For example, device proxy server 122 may receive an update message from user device 110 and may authenticate user device 110 by validating the session cookie and/or information associated with user device 110 (e.g., user device 110 MDN, PIN, username and/or password). If the device proxy server 122 determines that it cannot authenticate the session cookie or information associated with user device 110 (e.g., user device 110 MDN), then process 600 may end and user device 110 may not synchronize voicemail. If, however, device proxy server 122 authenticates user device 110, either by the session cookie or based on information associated with user device 110 then device proxy server 122 may generate an update message for VM server 140.

A voicemail update message may be generated and sent to VM server 140 (block 638). For example, device proxy server 122 may generate an update message that includes information associated with user device 110 (e.g., user device 110 MDN, PIN, username and/or password), voicemail location (e.g., storage location of voicemail within VM server 140 memory), and/or voicemail identifier information (e.g., MID and/or name, telephone number of caller, time and/or date of the voicemail, etc.) and the action to be performed.

VM server 140 may receive the voicemail update message and may synchronize voicemail with user device 110. For example, VM server 140 may receive a voicemail update message from device proxy server 122 and may authenticate user device 110 by validating information associated with user device 110 (e.g., user device 110 MDN, PIN, username and/or password) against information associated with user device 110 stored in the memory of VM server 140. If VM server 140 authenticates user device 110, VM server 140 may update voicemail within VM server 140 memory (e.g., save, delete, etc.) as directed by the update message received from device proxy server 122. VM server 140 may update voicemail associated with user device 110 and may send a voicemail update status message to device proxy server 122.

Device proxy server 122 may receive a voicemail update status message (block 640) and may generate and send an update status message to complete the voicemail synchronization (block 642). For example, device proxy server 122 may receive an update status message from VM server 140 and may generate an update status message by aggregating, formatting and compressing the update status message received from VM server 140. Device proxy server 122 may generate an update status message and may send, as a single communication, to user device 110 to complete the synchronization. The update status message may include a status as to the success or failure of the update.

VVM database 126 may be directed, by device proxy server 122 and/or VVM server 124, to temporarily and/or non-persistently store and/or cache information through the course of a session. VVM database 126 may have temporarily and/or non-persistently accumulated and/or stored (e.g., cached) session information during a session associated with user device 110 (e.g., user device 110 MDN, PIN, username password, etc.), voicemail identifier information (e.g., MID, name and/or telephone number of caller, voicemail date and/or time, etc.), voicemail location (e.g., storage location within VM server 140 memory) and/or voicemail metadata etc. At the conclusion of a session, (e.g., a user-initiated conclusion, session cookie expiration, authentication failure, etc.), device proxy server 122 may send a purge request to VVM database 126 directing that cached session information be purged, erased and/or otherwise expunged from VVM database 126 memory. VVM database 126 may receive the purge request and may purge, erase and/or otherwise expunge, from VVM database 126 memory, the cached session information (e.g., information associated with user device 110, voicemail identifier information, voicemail location and/or voicemail metadata, etc.).

FIG. 8 is an exemplary signal flow diagram for interacting through a device proxy server with a voicemail message in network 100 of FIG. 1A. Exemplary network portion 800 may include user device 110, device proxy server 122, notification server 130 and/or VM server 140. User device 110, device proxy server 122, VVM server 124, notification server 130 and/or VM server 140 may include features described above in connection with, for example FIG. 1A.

The exemplary visual voicemail proxying operation, as illustrated in FIG. 8, may be initiated when VM server 140 receives a voicemail 805 intended for user device 110. VM server 140 may provide, using the short message peer-to-peer (SMPP) protocol, a voicemail notification 810 to notification server 130. Voicemail notification 810 may include information associated with user device 110 (e.g., user device 110 MDN) and/or voicemail location (e.g., the location within VM server 140 memory where the voicemail is stored).

Notification server 130 may receive the voicemail notification 810 and may send a voicemail notification 815, using hypertext transfer protocol (HTTP), to device proxy server 122. Device proxy server 122 may receive voicemail notification 815 and may provide, using HTTP/internet mobile access protocol (HTTP/IMAP), a voicemail header request 820 to VM server 140. The voicemail header request 820 may include information associated with user device 110 (e.g., user device 110 MDN and/or PIN) and/or voicemail location (e.g., the storage location within VM server 140 memory). VM server 140 may receive voicemail header request 820 and may provide, using HTTP/IMAP, a voicemail header 825 to device proxy server 122. The voicemail header may include information associated with user device 110 (e.g., user device 110 MDN) and/or voicemail identifier information (e.g., MID, name and/or telephone number of caller, voicemail date and/or time, etc.).

Device proxy server 122 may receive voicemail header 825 and device proxy server 122 may temporarily store (e.g., cache) the voicemail header in the VVM database 126 as voicemail metadata. Device proxy server 122 may provide, using short message service (SMS) protocol, a voicemail notification 830 to user device 110. The voicemail notification 830 may include the voicemail location (e.g., the storage location within VM server 140 memory), number of voicemails received by VM server 140 and the telephone number of the last (e.g., most recent) voicemail received by VM server 140.

User device 110 may receive voicemail notification 830 and may send, using HTTP, a request 835, for the voicemail metadata, to device proxy server 122. The voicemail metadata request 835 may include information associated with user device 110 (e.g., user device 110 MDN and/or PIN), a session cookie and/or voicemail location (e.g., the storage location within VM server 140 memory). Device proxy server 122 may receive voicemail metadata request 835 and may authenticate user device 110 by validating the session cookie and/or information associated with user device 110 (e.g., user device 110 MDN and/or PIN, username and/or password) in a manner similar to that described above with respect to blocks 610-614 (FIG. 6). If device proxy server 122 validates user device 110, then device proxy server 122 may generate a session cookie and temporarily store the session cookie in VVM database 126 and may retrieve the voicemail metadata previously stored in VVM database 126.

Device proxy 122 may receive voicemail metadata from VVM database 126 and may generate a voicemail list in a manner similar to that described above with respect to block 618 (FIG. 6), (e.g., by formatting, compressing and aggregating the voicemail metadata, session cookie and/or user interface 500 as illustrated in FIG. 5A into a single file). Device proxy server 122 may generate the voicemail list and may send the voicemail list 840, using HTTP, to user device 110. Voicemail list 840 may include information associated with user device 110 (e.g., user device 110 MDN), voicemail identifier information (e.g., MID, name and/or telephone number of caller, voicemail date and/or time, etc.), session cookie, user interface 500 data and/or voicemail location (e.g., the storage location within VM server 140 memory). User device 110 may receive the voicemail list 840 and may compare the received voicemail list with the voicemail stored in user device 110 memory. If user device 110 determines that voicemail has arrived, then user device 110 may send, using HTTP, a request for voicemail audio files 845 to device proxy server 122. The voicemail audio file request 845 may include information associated with user device 110 (e.g., user device 110 MDN number), session cookie, voicemail location and the desired audio format (e.g., WAV, MP3, QCP, etc.).

Device proxy server 122 may receive a request for voicemail audio files 845 and may authenticate user device 110, in a manner similar to that described above with respect to blocks 622-626 (FIG. 7), (e.g., by validating the session cookie and/or user device 110 based on information associated with user device 110 (e.g., user device 110 MDN, PIN, password, and/or username, etc.)). Device proxy server 122 may authenticate user device 110 and may send, using HTTP, a request for voicemail audio files 850 to VM server 140. The request for voicemail audio files 850 may include information associated with user device 110 (e.g., user device 110 MDN number and/or PIN), voicemail identifier information (e.g., MID, name and/or telephone number of caller, date and/or time of voicemail, etc.) and voicemail location (e.g., the storage location within VM server 140 memory). VM server 140 may receive request for voicemail audio files 850 and VM server 140 may authenticate user device 110 using, for example, the information associated with user device 110 (e.g., user device 110 MDN, PIN, username and/or password, etc.) included in the request. VM server 140 may authenticate user device 110 and may send, using HTTP, the voicemail audio files 855 to device proxy server 122. Voicemail audio files 855 may include the audio files (e.g., in WAV, MP3 and/or QCP format, etc.), information associated with user device 110 (e.g., user device 110 MDN number), and/or voicemail identifier information (e.g., MID, name and/or telephone number of caller, voicemail date and/or time, etc.).

Device proxy server 122 may receive voicemail audio files 855 and may process (e.g., format, aggregate and compress) in a manner similar to that described above with respect to block 630 (FIG. 7). Device proxy server 122 may send, using HTTP, a processed voicemail audio file 860 to user device 110. The processed voicemail audio file 860 may include information associated with user device 110 (e.g., user device 110 MDN), voicemail identifier information (e.g., MID, name and/or telephone number of caller, voicemail date and/or time, etc.) and audio content suitable for user device 110 (e.g., WAV, MP3, QCP, etc.).

User device 110 may receive voicemail audio file 860 and the user (e.g., the user of user device 110) may manage the voicemail (e.g., by saving, deleting, forwarding, replying, etc.). User device 110 may send, using HTTP, an update message 865 (e.g., by saving, deleting, forwarding, replying, etc.) to device proxy server 122. The update message 865 may include information associated with user device 110, (e.g., user device 110 MDN number), a session cookie, voicemail location (e.g., the storage location within VM server 140 memory) and voicemail identifier information (e.g., MID, name and/or telephone number of caller, voicemail date and/or time, etc.). Device proxy server 122 may receive an update voicemail message 865 and may authenticate user device 110 in a manner similar to that described above with respect to blocks 634-638 (FIG. 7). Device proxy server 122 may authenticate user device 110 and may send, using HTTP, an update voicemail message 870 to VM server 140. The update voicemail message 870 may include information associated with user device 110 (e.g., user device 110 MDN and/or PIN), voicemail identifier information (e.g., MID, name and/or telephone number of caller, voicemail date and/or time, etc.) and voicemail location (e.g., the storage location within VM server 140 memory).

The VM server 140 may receive update message 870 and may synchronize voicemail and/or authenticate user device 110 in a manner similar to that described above with respect to block 640 (FIG. 7). VM server 140 may send, using HTTP, an update status message 875 to device proxy server 122 indicating the success or failure of the request to manage voicemail. Device proxy server 122 may receive an update message status 975 and may format, aggregate and/or compress the update message in a manner similar to that described above with respect to block 642 (FIG. 7). Device proxy server 122 may send an update status message 880 to user device 110 indicating the success or failure of the request to manage voicemail.

FIG. 9A is a simplified diagram of an exemplary network 100 of FIGS. 1A and 1B without device proxy server 122. In one implementation, during an exemplary proxying operation between user device 110, VVM server 124 and/or VM server 140, user device 110 may display user interfaces such as user interfaces 500, 520 and/or 540 of FIGS. 5A-5C. VVM server 124, without device proxy server 122, as depicted in FIG. 9A, may be capable of displaying, on user device 110, user interfaces 500, 520 and/or 540 and some or all of the data elements 502-558 as illustrated in FIGS. 5A-5C. However, depending on the complexity of the user interface, VVM server 124 of FIG. 9A, without device proxy server 122, may need to send separate and distinct communications (e.g., requests for data from user device 110 and a corresponding data responses from VVM server 124 and/or VM server 140) in order to display the user interfaces illustrated in FIGS. 5A-5C. For example, user device 110 may need to send a distinct communication for each user interface (e.g., 500, 520 and/or 540 of FIGS. 5A-5C) and/or associated data element (e.g., 502-558 of FIGS. 5A-5C) to enable to user device 110 to display the user interfaces of FIGS. 5A-5C.

The large number of communications required to enable user device 110 to display user interfaces illustrated in 5A-5C may require significant user device 110 processing time and capacity and may cause undue load on VVM server 124 and backend VM server 140. Moreover, the communications between user device 110 and the VVM server 124 may consume significant bandwidth, which may be particularly stressing when user device 110 is a wireless communication device. Moreover, device-to-server communications (e.g., between user device 110 and VVM server 124), may be further strained by the additional bandwidth and processing capacity needed to perform security authentications for each communication.

VVM server 124, without device proxy server 122 as illustrated in FIG. 9A, may also lead to an inflexible architecture. For example, it may be difficult to introduce new user device 110 versions, types and/or capability upgrades due to incompatibilities between user device 110 architecture, message protocols and/or application software and architecture, message protocols and/or application software used by VVM server 124, VM server 140 and/or other servers or network devices.

The use of device proxy server 122 may eliminate or reduce the problems discussed immediately above. FIG. 9B is a simplified diagram of an exemplary network 100 FIGS. 1A and 1B with device proxy server 122. In one implementation, during an exemplary proxying operation between user device 110 and VVM server 124, user device 110 may display user interfaces (e.g., user interfaces 500, 520 and/or 540 of FIGS. 5A and 5C). VVM server 124, with device proxy server 122, as depicted in FIG. 9B, may be capable of displaying, on user device 110, user interfaces 500, 520 and/or 540 and user interface data elements 502-558 as illustrated in FIGS. 5A-5C. In the FIG. 9B implementation, however, device proxy server 122 may bridge communications between user device 110, VVM server 124, VM server 140 and/or other network servers or devices and, depending on the complexity of the user interface, may significantly reduce the number of device-to-server communications required to display user interfaces 500, 520 and/or 540 due to the aggregation capability of device proxy server 122.

In the implementation of FIG. 9B, device proxy server 122 may act as an extension of user device 110 by executing a significant portion of the processing that otherwise would be performed by user device 110, which may have limited processing capacity. Moreover, device proxy server 122 may format user device 110 requests so they are compatible with backend servers (e.g., VM server 140). Device proxy server 122 may manage and enable a significant portion of peer-to-peer (e.g., server-to-server) communications, which may be faster, cheaper and/or more secure than device-to-peer communications with backend servers (e.g., user device 110 to VVM server 124 and/or VM server 140). Device-to-peer communications may also be significantly slower, more expensive and more vulnerable as compared to peer-to-peer.

Another example where device proxy server 122 may act as an extension of user device 110 involves reformatting and compressing data into a customized format suitable for a variety of user device 110 versions and/or types. Moreover, device proxy server 122 may act as an extension of user device 110 by aggregating multiple backend communications (e.g., from VM server 140) into a single, formatted communication to user device 110, which may reduce network traffic, processing capacity needed by user device 110 and user device 110 processing time. For example, VVM server 124 of FIG. 9B, with device proxy server 122, may be capable of producing user interface 540, including and data elements 542-558 of FIG. 5C, in only a fraction of the time or, with a minimal number of slower, more expensive and less secure device-to-peer communications as compared with the VVM server 124 of FIG. 9A, without the device proxy server 122. In this example, user interface 540 of FIG. 5C may be displayed on user device 110 by a single request from user device 110 to device proxy server 122; a series of managed and/or optimized two-way server-to-server communications between device proxy server 122 and VVM server 124 and/or VM server 140; and a single formatted, compressed and aggregated communication from device proxy server 122 to user device 110. In this example, user device 110 may no longer need to process or manage multiple communications to and/or from VVM server 124 and/or VM server 140 due to device proxy server 122 taking on that function.

In other implementations, device proxy server 122 may reformat data going to user device 110 in a number of ways. Device proxy server 122 may reformat audio files, dynamically resize images, thumbnails and previews to enable user device 110 to understand and process this information. Device proxy server 122 may reduce communications to backend servers (e.g., VM server 140) by temporarily storing (e.g., caching) information or data in VVM database 126 for future reuse that may reduce backend-load. For example, device proxy server 122 may cache voicemail metadata, session cookies, information associated with user device 110 (e.g., user device 110 MDN, PIN, username, etc.), may maintain user device 110 version control and may perform log analysis for server performance optimization and communication to VVM server 124 and VM server 140.

The reduction in the number of communications, as discussed in the previous examples, may dynamically increase security of VVM server 124 by proportionally reducing number of communications required to perform authentications. Moreover, device proxy server 122 may greatly simplify user device 110 authentication by the use of a session cookie, which reduces the number of communications that would otherwise be required to repeatedly retrieve user device 110 based on information associated with user device 110 (user device 110 MDN, PIN, username and/or password) from backend servers (e.g., VM server 140) and/or user device 110.

A flexible and scalable architecture of FIG. 9B may be enabled by device proxy server 122 as a memory-less device where persistent information may be stored in and/or retrieved from user device 110 or backend VM server 140. This architecture may protect against the loss of information, which may be recoverable merely by communicating with the backend VM server 140 and/or user device 110. Furthermore, device proxy server 122 may provide a more flexible and scalable architecture that may not be limited to the numbers of user devices (e.g., user device 110) or VVM server 124 servers or backend servers (e.g., VM server 140) with which to communicate and/or for which to perform proxying operations (e.g., formatting, caching, aggregating, etc.). For example, device proxy server 122 may provide scalability and flexibility where network capacity may be increased or decreased by merely adding, reducing or reconfiguring hardware (e.g., user devices 110, VVM servers 124, VM servers 140, etc.), respectively.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as an ASIC or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device and from a user device, a request for voicemail files;
   determining, by the server device, a format that is recognized by one or more voicemail servers;
   generating, by the server device, a formatted request based on the request and the format that is recognized by the one or more voicemail servers;
   sending, by the server device, the formatted request to the one or more voicemail servers;
   receiving, by the server device, the voicemail files from the one or more voicemail servers;
   performing, by the server device, a plurality of data calls or communications to one or more visual voicemail servers to obtain components that are used to construct a visual user interface,
      the one or more voicemail servers being different from the one or more visual voicemail servers;
   constructing, by the server device, the visual user interface based on the voicemail files and the components; and
   transmitting, by the server device, the visual user interface to the user device.

2. The method of claim 1,
   where the request includes a first session cookie, and
   where the method further comprises:
      determining that the first session cookie is valid based on the first session cookie matching a second session cookie stored in a memory of the server device; and
      authenticating the user device after determining that the first session cookie is valid and before receiving the voicemail files.

3. The method of claim 1,
   where the request includes a first session cookie and information associated with the user device, and
   where the method further comprises:
      determining that the first session cookie is invalid based on the first session cookie not matching a second session cookie stored in a memory;
      authenticating the user device based on the information associated with the user device after determining that the first session cookie is invalid;
      generating a third session cookie after authenticating the user device;
      storing the third session cookie in the memory; and
      sending the third session cookie to the user device.

4. The method of claim 1, further comprising:
   storing session information corresponding to a voicemail session associated with the request for the voicemail files from the user device; and
   erasing the session information when the voicemail session expires.

5. The method of claim 1, where constructing the visual user interface includes:
   determining a format that is recognized by the user device based on information associated with the user device, and
   constructing the visual user interface based on the components, the voicemail files, and the format that is recognized by the user device.

6. The method of claim 1, where the voicemail files include voicemail audio files.

7. The method of claim 1,
   where the formatted request includes information associated with the user device, and
   where the information associated with the user device is used by the one or more voicemail servers to authenticate the user device.

8. The method of claim 1, further comprising:
   receiving a notification regarding a voicemail intended for the user device;
   pre-fetching voicemail metadata, associated with the voicemail, based on the notification; and
   storing the voicemail metadata.

9. The method of claim 8, further comprising:
   formatting the voicemail metadata into a voicemail notification;
   performing a plurality of different data calls or communications to the one or more visual voicemail servers to obtain different information to construct a different visual user interface that includes data regarding the voicemail notification; and
   sending the different visual user interface to the user device.

10. A method comprising:
    receiving, by a server device, a voicemail notification associated with a user device;
    pre-fetching, by the server device, voicemail metadata based on the voicemail notification;
    formatting, by the server device, the voicemail metadata into a visual voicemail list;
    sending, by the server device and to the user device, the visual voicemail list;

receiving, by the server device and from the user device, a request associated with an item in the visual voicemail list;
determining, by the server device, a format that is recognized by one or more voicemail servers;
generating, by the server device, a formatted request based on the request and the format that is recognized by the one or more voicemail servers;
sending, by the server device, the formatted request to the one or more voicemail servers;
receiving, by the server device and from the one or more voicemail servers, one or more voicemail files associated with the visual voicemail list;
performing, by the server device one or more data calls or communications to one or more visual voicemail servers to retrieve visual user interface data elements,
the one or more voicemail servers being different from the one or more visual voicemail servers;
assembling, by the server device, a visual user interface based on the voicemail files and the visual user interface data elements; and
sending, by the server device, the visual user interface to the user device.

11. The method of claim 10, further comprising:
storing the voicemail metadata during a voicemail session associated with the user device; and
purging the voicemail metadata when the voicemail session expires.

12. A non-transitory computer-readable medium storing instructions, the instructions comprising:
one or more instructions that, when executed by at least one processor, cause the at least one processor to:
receive a request for one or more voicemail audio files;
determine a format that is recognized by one or more voicemail devices;
generate a formatted request based on the request and the format that is recognized by the one or more voicemail devices;
send the formatted request to the one or more voicemail devices;
receive the one or more voicemail audio files from the one or more voicemail devices;
perform one or more data calls or communications to one or more visual voicemail devices to retrieve visual user interface data elements,
the one or more voicemail devices being different from the one or more visual voicemail devices;
create a visual user interface based on the visual user interface data elements; and
output the visual user interface.

13. A server device comprising:
a memory to store a first session cookie; and
a processor, connected to the memory, to:
receive, from a user device, a request for voicemail files, the request including a second session cookie;
determine that the second session cookie is valid when the second session cookie matches the first session cookie,
determine a format that is recognized by at least one voicemail server,
generate, when the second session cookie is valid, a formatted request based on the request and the format that is recognized by the at least one voicemail server,
send the formatted request to the at least one voicemail server,
receive the voicemail files from the at least one voicemail server,
perform, when the second session cookie is valid, one or more data calls or communications to at least one visual voicemail server to retrieve components that are used to assemble a visual user interface,
the at least one voicemail server being different from the at least one visual voicemail server,
assemble the visual user interface based on the voicemail files and the components, and
provide, to the user device, the visual user interface.

14. The server device of claim 13, where the processor is further to:
receive, from the user device, a first message that indicates an action taken by a user, of the user device, regarding a voicemail identified in the visual user interface,
provide, to a voicemail server of the at least one voicemail server, the first message,
receive, from the voicemail server, a second message that indicates success or failure of the action, and
provide, to the user device, the second message.

15. The server device of claim 13, where the processor is further to:
receive a voicemail notification,
pre-fetch voicemail metadata based on the voicemail notification, and
store the voicemail metadata before receiving the request for the voicemail files.

16. The server device of claim 13,
where the request further includes first information associated with the user device,
where the memory is further to store second information associated with the user device, and
where the processor is further to:
determine that the second session cookie is invalid when the second session cookie does not match the first session cookie,
compare, when the second session cookie is invalid, the first information to the second information, and
generate, when the second session cookie is invalid, an authentication result based on comparing the first information to the second information.

17. The server device of claim 13, where the processor is further to:
send, to an authentication server, information associated with the user device when the second session cookie does not match the first cookie, and
receive, from the authentication server, a notification of success or failure of authentication of the user device.

18. The server device of claim 13, where the processor is further to:
store the voicemail files during a voicemail session associated with the user device, and
erase the voicemail files when the voicemail session expires.

19. A system comprising:
a server to:
provide, to a user device, a visual voicemail list for display by the user device,
receive, from the user device, a request for voicemail files associated with the visual voicemail list,
determine a format that is recognized by one or more voicemail servers,
generate a formatted request based on the request and the format that is recognized by the one or more voicemail servers,
send the formatted request to the one or more voicemail servers, receive the voicemail files from the one or more voicemail servers, perform one or more data calls or communications to one or more visual voicemail servers to retrieve components that are used to assemble a visual user interface, the one or more voicemail servers being different from the one or more visual voicemail servers, assemble the visual user interface based on the voicemail files and the components, and provide the visual user interface to the user device.

20. The system of claim 19, where, when assembling the visual interface, the server is further to:

determine a format that is recognized by the user device based on information associated with the user device, and assemble the visual interface based on the format that is recognized by the user device, the voicemail files, and the components.

21. The non-transitory computer-readable medium of claim 12, where the visual user interface data elements include one or more of:

an object that identifies a quantity of the one or more voicemail audio files available to a user device, a first button that allows a user of the user device to request to listen to a particular voicemail audio file of the one or more voicemail audio files, or a second button that allows the user of the user device to request to ignore the particular voicemail audio file.

\* \* \* \* \*